J. H. GRAHAM.
WIRE SPOKE CONNECTION.
APPLICATION FILED AUG. 27, 1917.
1,333,019.
Patented Mar. 9, 1920.
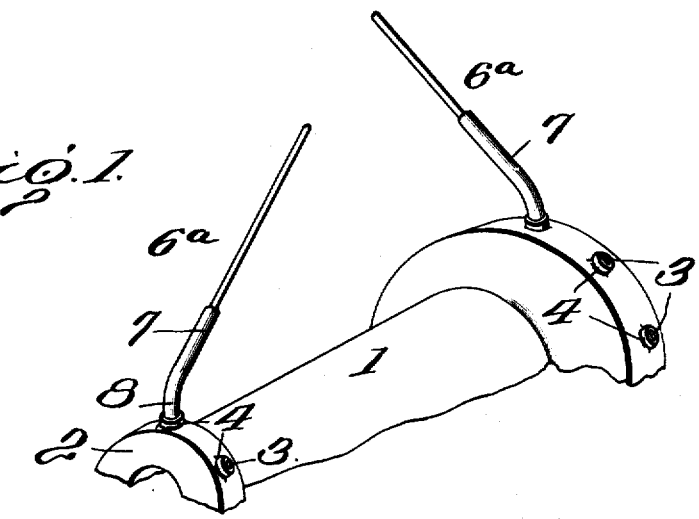
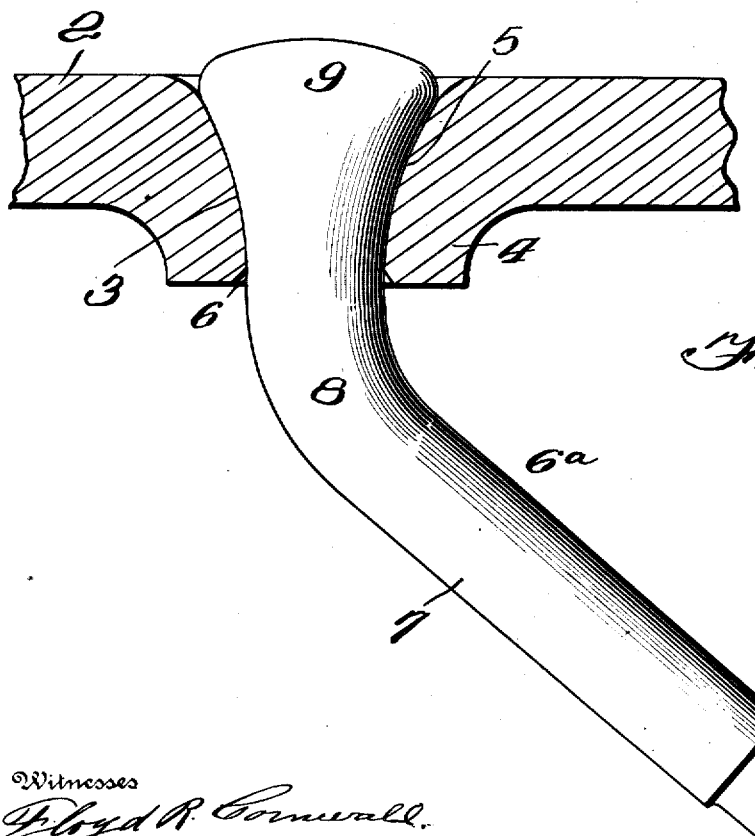

UNITED STATES PATENT OFFICE.

JAMES H. GRAHAM, OF TORRINGTON, CONNECTICUT, ASSIGNOR, BY MESNE ASSIGNMENTS, TO THE TORRINGTON COMPANY, OF TORRINGTON, CONNECTICUT, A CORPORATION OF CONNECTICUT.

WIRE-SPOKE CONNECTION.

1,333,019.     Specification of Letters Patent.     Patented

Application filed August 27, 1917. Serial No. 188,434.

*To all whom it may concern:*

Be it known that I, JAMES H. GRAHAM, a citizen of the United States, residing at Torrington, in the county of Litchfield, State of Connecticut, have invented certain new and useful Improvements in Wire-Spoke Connections, of which the following is a description, reference being had to the accompanying drawing and to the figures of reference marked thereon.

My invention relates to improvements in wire spoke connections.

The object of my invention is to provide a strong and durable connection between the spoke and hub or between the spoke and rim to prevent the endwise thrust on the spoke from wearing or cutting the same at the point of contact with the rim or hub and at the same time allowing for the ready insertion of the spoke.

A still further object of my invention is to provide a cheap, simple and effective connection which can be applied without altering the general construction of the hub or rim.

In the accompanying drawings:

Figure 1 is a perspective view of a portion of a wheel showing the connection between the spoke and hub.

Fig. 2 is an enlarged vertical sectional view of the connection.

In the usual spoke connection now used the hub is provided with an outwardly extending flange having transverse horizontal openings therethrough, the walls of which are straight, and a counter sunk portion in which the head of the spoke fits, preventing the spokes from pulling through the openings. The spoke on the outside of the flange is bent at an angle and the endwise thrust on the spoke causes it to engage a very small portion of the wall of the opening and to also engage the sharp corner of the opening which cuts and wears away the spoke at one point.

In my improved spoke connection, the hub 1 is provided with the lateral flanges 2 having the transverse openings 3 formed therein. Surrounding said openings are outwardly extending flanges 4 forming a larger bearing surface for the spoke as will be later described. The wall of the flange and the wall of the opening are continuous and arranged in the arc of a circle as indicated at 5 in Fig. 2. The outer edge of the flange is cut away or flares outwardly as indicated at 6 to dispense with any sharp cutting edge that might engage the spoke and cut or wear the same. The spoke 6ª is of the usual construction having the enlarged or bell-shaped portion 7 bent at an angle as indicated at 8 and the end beyond the same is provided with the gradually enlarged portion 9 the walls of which are concaved and of the size of and formed on the same arc of a circle as that of the openings in the hub flange. Thus the spoke has a large bearing surface closely fitting the wall of the opening.

By this structure it will be seen that any endwise thrust of the spoke does not give a direct transverse movement of the spoke against the wall of the opening but causes a slight rolling action, so that the wear is on a large surface and there are absolutely no sharp corners for wearing of the spoke.

Having thus described my invention, what I claim as new and desire to secure by Letters Patent, is:—

A spoke connection comprising a hub having a lateral flange provided with a series of transversely projecting flanges thereon, said hub and flanges being provided with continuous openings, the walls of which form arcs of circles, the outer edges of said flanges flaring outwardly, spokes fitting in said opening, said spokes being formed with bell-shaped heads, the walls of which are of substantially the size and formed on the same arc of a circle as the openings in the hub and flange.

In testimony whereof, I affix my signature, in the presence of two witnesses.

JAMES H. GRAHAM.

Witnesses:
C. L. STURTEVANT,
B. B. CLARK.